LE GRAND PARISH.
METHOD OF MAKING BOLTS.
APPLICATION FILED JUNE 30, 1917.

1,244,125.

Patented Oct. 23, 1917.

WITNESS:

INVENTOR
Le Grand Parish
BY
ATTORNEYS.

UNITED STATES PATENT OFFICE.

LE GRAND PARISH, OF MOUNTAINVIEW, NEW JERSEY.

METHOD OF MAKING BOLTS.

1,244,125.   Specification of Letters Patent.   Patented Oct. 23, 1917.

Original application filed March 2, 1912, Serial No. 681,259. Divided and this application filed June 30, 1917. Serial No. 177,932.

*To all whom it may concern:*

Be it known that I, LE GRAND PARISH, a citizen of the United States, residing in Mountainview, in the county of Passaic and State of New Jersey, have invented certain new and useful Improvements in Methods of Making Bolts, of which the following is a specification.

This invention, which is a division of my co-pending application, Serial Number 681,259, filed March 2, 1912, relates to methods of making bolts and has for one of its primary objects the provision of an improved method whereby bolts can be expeditiously and economically made, with a minimum amount of metal, and with the metal disposed in such manner as to secure greatly increased strength at the points where most needed.

I accomplish the foregoing by means of a method which I have diagrammatically illustrated in the accompanying drawings, wherein—

Figure 1:
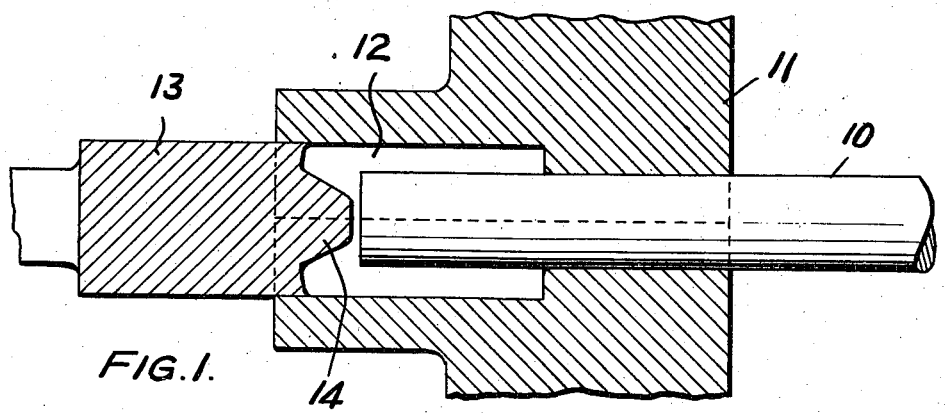
Figure 2:
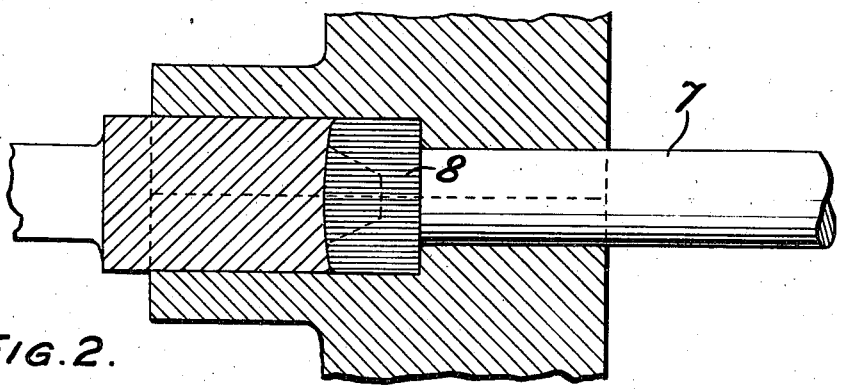
Figures 3, 4:
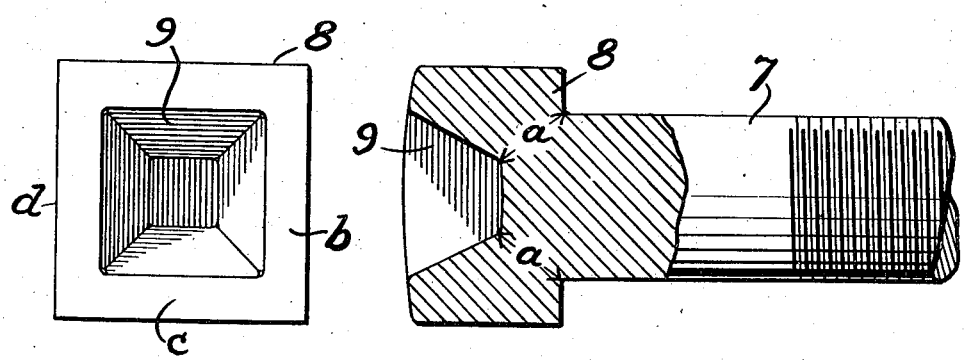

Figures 1 and 2 are sectional views illustrating various steps of my improved method; Fig. 3 is a longitudinal section through a portion of a stay-bolt made in accordance with my invention; and Fig. 4 is an end view of the bolt shown in Fig. 3.

Describing first the bolts made in accordance with my invention, it will be seen on reference to Figs. 3 and 4 that the bolts have the usual shank portion 7 and a head 8, which may be of the square type as shown, or of any other desired form, but which has a pyramidal recess 9 formed in the face thereof corresponding in configuration to the head. Stated in other words, for square headed bolts the recess will be substantially square pyramidal.

In making the bolts I pursue the following method: The bolts are made from bar stock 10, which is preferably fed forward step by step by any desired form of mechanism, and which is suitably supported at the work end by means of the two-part stationary die 11 which is provided with a recess 12 in its face of the conformation of the head to be made. Arranged in alinement with said recess and bar 10, is a movable die 13 provided with a projection 14 of a configuration corresponding to the shape of the head to be formed, and adapted to form the recess 9 in the head of the bolt. Assuming that the parts are in the position indicated in Fig. 1, the die 13 is advanced and compresses the end of the bar 10, upsetting the head 8 and simultaneously forming the recess 9 therein. The bolt is then cut off with the desired length of shank.

It will be noted that the bolt thus formed is of the same general formation as the usual bolt but requires less metal for the same sizes, and this effects a great saving when the bolts are made in quantities as is the usual practice. At the same time a maximum strength is secured for the metal forming the head is compressed by the die 13 and the projection 14 when the head is being upset and the recess formed.

It will be noted that the projection 14, because of its frusto-pyramidal shape, leaves a much thicker portion of metal in the head adjacent the point of juncture between the head and the shank, and such portions of the metal, which I have indicated by the letter *a*, will be far more densely compressed, thus affording greater initial shear resistance, more than compensating for the possible reduction in shear strength occasioned by the decrease in the actual volume of metal forming the head. By reason of its wedge like shape therefore the projection 14 secures proper distribution and greater density of the metal, giving the head of the bolt a shear strength greater than that of the shank, and sufficiently great for all ordinary purposes. Each of the side walls of the head, as indicated at *b*, *c* and *d*, buttresses or supports the adjacent walls.

I claim:—

1. The herein-described process of forging bolts from bar stock which consists in upsetting the head and forming a recess having converging walls in the face of the head by the same operation, the depth of the recess being less than the depth of the head.

2. The herein-described process of forging bolts from bar stock which consists in upsetting a head of greater dimension than the shank and in simultaneously forming a recess in the face of the head of substantially the same configuration as the head, the depth of the recess being less than the depth of the head.

3. The herein-described process of forging bolts from bar stock which consists in upsetting a head of greater dimension than the shank and in forming a recess in the face of the head having converging walls, the depth of the recess being less than the depth of the head, and the width of that portion of the recess nearest the shank being less than the diameter of the shank.

In testimony whereof I have hereunto signed my name.

LE GRAND PARISH.